United States Patent [19]
Reid

[11] Patent Number: 6,131,120
[45] Date of Patent: Oct. 10, 2000

[54] ENTERPRISE NETWORK MANAGEMENT DIRECTORY CONTAINING NETWORK ADDRESSES OF USERS AND DEVICES PROVIDING ACCESS LISTS TO ROUTERS AND SERVERS

[75] Inventor: William J. Reid, Dallas, Tex.

[73] Assignee: Directory Logic, Inc., Dallas, Tex.

[21] Appl. No.: 08/956,697

[22] Filed: Oct. 24, 1997

[51] Int. Cl.[7] .......................... G06F 15/173; G06F 15/16
[52] U.S. Cl. .......................... 709/225; 709/238; 709/249
[58] Field of Search .................................. 709/225, 238, 709/249

[56] References Cited

U.S. PATENT DOCUMENTS

| 5,634,010 | 5/1997 | Liscon et al. | 709/223 |
| 5,774,668 | 6/1998 | Choquier et al. | 709/223 |
| 5,796,727 | 8/1998 | Harrison et al. | 370/338 |
| 5,825,772 | 10/1998 | Dobbins et al. | 370/396 |

*Primary Examiner*—Krisna Lim
*Attorney, Agent, or Firm*—John E. Vandigriff

[57] ABSTRACT

An enterprise network using a wide area network (WAN), and having routers and servers, uses a master directing to determine access rights, including the ability to access the WAN through the routers and the ability to access the sewer over the WAN.

23 Claims, 8 Drawing Sheets

ENTERPRISE NETWORK MANAGEMENT DIRECTORY CONTAINING NETWORK ADDRESSES OF USERS AND DEVICES PROVIDING ACCESS LISTS TO ROUTERS AND SERVERS

FIELD OF THE INVENTION

The present invention relates to computer networks for managing enterprise network access and providing enterprise network security.

BACKGROUND OF THE INVENTION

The marketplace for many companies has expanded from a national to a world marketplace. Large international companies have expanded into global companies and smaller companies have become international competitors. This market expansion has been driven by technology that has made both voice and data communication easier.

Technological advances in recent years have allowed computer users to maintain access to their corporate or home informational networks, regardless of where they work or where they travel, through "remote offices", "mobile computing", and "telecommuting." Remote offices refers to parts of a company organization than are geographically spaced from the main or base office, and may include foreign manufacturing plants, regional sales offices, or vendor organizations. Mobile computing refers to the use of transportable self-contained computers, such as a laptop computer, including means for establishing a telecommunications link to a server or network of other computers. Telecommuting refers to the use of a telecommunications link, particularly through a computer, to enable a working individual to conduct his or her business from any desired location, rather than having to physically travel to a particular place of work.

FIG. 1, generally at 50, shows a prior art system that a remote user currently may use to communicate with a home network. The system 50 has remote users 52 and 54 that communicate through a wide-area network (WAN) to a company or home network 60. WAN 58 may include dedicated or non-dedicated network links. A typical dedicated network would include a frame relay network elements and a typical non-dedicated network would include a TCP/IP network elements.

Remote users can communicate with WAN 58 in a number of different ways. As shown in FIG. 1, user 52 connects to the WAN 58 through a modem 62, a public switched telephone network (PSTN) 64, and a server 66. User 52 can be a mobile or a stationary user. User 54, shown as a stationary user with a desktop computer, connects to WAN 58 through a router 56 and a dedicated local loop 59. Local loop 59 connections normally are provided by a local exchange carrier (LEC) such as Southwestern Bell or Bell Atlantic. WAN 58 could be a private company network of leased lines or frame relay connections, or it could be a public network, such as the Internet.

Home network 60 has a destination server 80 and firewall 82, and as shown in FIG. 1, a Local Area Network (LAN) 84 with a LAN server 86 and a number of workstations 88. There can be many LANs, servers, and other resources in the company or home network, including fax servers, printers, file servers, and database servers.

Firewall 82 is either a device or an application that controls the access between internal LAN 84 and external public entrusted networks such as the Internet or a PSTN. Firewall 82 tracks and controls communication, deciding where to pass, reject, encrypt, or log communications, and requires that these communications adhere to a defined security policy. Firewall 82 normally functions in four areas: access control; authentication; optional encryption/decryption; and routing. Firewalls manufactured by Check Point Software Technologies Ltd. and Raptor Systems, Inc. each have these capabilities.

Access control is the firewall mechanism to grant access to a class of users or to a class of users that use specific protocols, such as HTTP (the Internet access protocol). Access control is established by setting up user definitions, server and gateway definitions, and establishing protocols. Access control in a firewall is rule-based in that a security rule defines the relationship between the definitions.

Authentication is a mechanism to verify the authenticity of both the sender and the message. Broadly, authentication may encompass three types of technology: (1) password based; (2) token based; and (3) biometric. Authentication grants access privileges to specific users to access specific network resources and/or specific network applications.

Encryption/decryption is an optional mechanism to transform a message so that the encrypted message can only be read with the aid of same additional information (a key) known to the sender and the intended recipient alone. In secret key encryption, the same key is used to encrypt a message and then to decrypt it. In public key encryption, two mathematically related keys are used, one to encrypt the message and the other to decrypt the message.

Routing is a firewall mechanism to determine which network resource(s) should receive the message. In a typical firewall, a user, or user groups, can be routed to one or more destinations on the basis of certain rules. Because these rules require set-up and maintenance, the routing is typically controlled with broad rules for large groups of people systems.

Firewalls are installed to address the threats of hostile external network intrusion but have limited abilities to reduce or eliminate internal network vulnerabilities or social engineering attacks as discussed below. Firewalls are generally rules based products where a typical rule may be "Marketing users can get to the Internet Server only with HTTP".

Network Management

An enterprise network is a network for an enterprise, including multiple LANs, routers and servers, typically geographically separated. The networks of the Enterprise network can be connected together over a wide area network. Enterprise network management that has evolved from the mainframe environment is still centered mainly on the operating systems and is mostly manual and resource intensive. Numerous tools have been developed to aid in network management. Routers are normally configured and managed with a Telnet tool. Telnet also is used for remote control of routers, firewalls, and servers.

Simple Network Management Protocol (SNMP) is used to manage network nodes and to monitor operation. Servers are generally manually configured with users manually coded into a user control program. Other tools include capacity planning, fault management, network monitoring, and performance measurement.

A router or routing/switching device is used in enterprise networks to route user messages and files to and from internal LAN 60 and an external WAN 58. The routing device can recognize that the user workstation 86 has issued a destination address not located on LAN 60 for a message or for a file transfer and, therefore, that the message or file needs to be forwarded to external WAN 58. Similarly, the routing device can recognize a destination address on WAN 58 for a resources on its internal LAN 60, and therefore the device will forward that WAN 58 message or file to the internal network served by the router.

An analogy to this data network routing is the operation of the PSTN (Public Switched Telephone Network). When a seven-digit number is dialed, if the first three digits are a valid local exchange, the call will remain in the local exchange. Similarly, when the NetID of destination IP address is the same as the NetID of the local network the data packets will remain on the LAN. If a ten-digit number is dialed, if the first three digits are for a valid area code, the call will be routed to the long distance network. Similarly, when the NetID of a destination IP address is different from the NetID of the local network, the data packets will be forwarded to the WAN.

Routing devices generally use one or more methods for obtaining routing instructions. First, routers have static routing instructions that are manually coded into the routing instructions. This manual coding may be by user interaction with a router operating system, such as Cisco lOS, or by downloading the coding over the network through Telnet or SNMP. Second, the router may learn routing instructions through routing protocols such as RIP or IGRP. These protocols communicate with other routers on the network and share routing information.

Servers

Computers with network interfaces and special multi-user software are used as LAN and WAN servers. A LAN server 84 may often be called a file server. Examples of network servers are WINS (Windows Internet Naming Server), DNS (Domain Name Server) and DHCP (Dynamic Host Control Protocol) server, Internet server, and Intranet server.

Security

As enterprise-wide data networks have expanded, the need for network security has increased. Firewall and encryption technologies, as described in the prior art, have been developed to address some of the network security needs. However, the majority of network security problems is not being addressed by current technological solutions.

The largest reported losses in network security come from internal theft and sabotage. Internal networks are normally open so that many users have root level control, which allows operators to do everything on servers including copying files, planting viruses, and erasing all information. Disgruntled employees can take advantage of such an open network to perform illegal acts.

The next largest reported loss is referred to as "social engineering." Social engineering uses social interaction with inside employees to obtain network access information. Covert social engineering actives are typically undertaken when significant theft or espionage is planned, so it normally results in substantial losses.

The other area of reported losses is hostile external network intrusion. A firewall is useful for protecting a network in this area.

Directory Services

Directory services products are generally focused on either LAN or WAN environments. The largest installed base of directory services is Novell's NDS (Netware Directory Services) with over 10 million units installed. NDS is a product focused primarily at the LAN level and used to provide computer workstations 86 with access to shared resources such as files servers or printers in a LAN 60. The Novell product and other similar directory products, are proprietary from product manufacturers and are not under the management of any open standards body.

One enterprise level directory technology (X.500) has been used to integrate phone directory information, e-mail, and fax addressing across an enterprise. A directory is a standard database providing distributed, scalable, client/server-based repositories of data that are read much more frequently than modified (for example, user definitions, user profiles, and network resource definitions). Users applications can access these directories through directory access protocols (DAPs). In network environments, exemplary DAPs includes X.500 directory access protocols and Lightweight Directory Access Protocol (LDAP).

X.500 is a directory service defined by a set of international standards published jointly by the International Standards organization (ISO) and the International Telecommunications Union (ITC, formerly CCITT) standards bodies. Originally developed in 1988 to be a general e-mail directory, the standards have developed to envision a general global information service. Directory services have been applied, as the name implies, to provide users with a directory of available services.

Architectural View of Directories

FIG. 2 is a prior functional diagram showing the relationship between the X.500 directory services and the ISO network layers. The top ISO networking layer is an application, such as word processing, fax or e-mail. The bottom layer of the ISO model is the physical layer, such as a twisted-pair of wire or fiber optic cable. The current X.500 directory services is an application program that works to manage other application layer programs such as e-mail, phone directories and faxing.

FIG. 3 is a functional block diagram showing the protocol application at the ISO network layers. The protocol developed for the X.500 application to communicate with other applications, like e-mail, was DAP. Recently the LDAP protocol was defined at the network layer to allow communication between routers, firewalls and other network level devices.

For an application to have a unique operation at the lower layers, such as the network layer level, another application program is required to add the specific functionality at the lower layers. For example, to encrypt e-mail, one needs to obtain a product, such as ArmorMail from LJL Enterprises, Inc. of Huntsville, Ala. E-mail is an Application layer program and encryption occurs directly before the Link layer. The ArmorMail product creates the bridge between that e-mail application and the Link layer.

FIG. 2 shows the OSI (open system interconnect) reference model that describes a communications in the seven hierarchical layers that are shown. Each of these layers provides services to the layer above and invokes services from the layer below. Typically, end users of the communications system interconnect to the application layer, which may be referred to as a distributed operating system because it supports the interconnection and communication between end users that are distributor. The OSI model allows the hiding of the difference between locally connected and remotely connected end users, so the application layer appears as a global operating system. Normally, in a distributed operating system, the global supervisory control for all of the layers resides in the application layer.

Each of the layers contributes value to the communications system. The application layer uses the presentation layer, and is concerned with the differences that exist in the various processors and operating systems in which each of the distributed communications systems is implemented. The presentation service layer uses the session layer, and manages the dialogue between two communicating partners.

The session layer assures that the information exchange conforms to the rules necessary to satisfy the end user needs. The session layer uses the transport layer, and creates a logical pipe between the session layer of its system and that of the other system. The transport layer uses the network layer to create a logical path between two systems. The transport layer is responsible for selecting the appropriate lower layer network to meet the service requirement of the session layer entities. This connection is generally though of as a point-to-point connection. The network layer uses the data link layer, and establishes a connection between the entities and this is based on a protocol for the connection. The data link layer uses the physical layer. The data link layer is responsible for building a point-to-point connection between two system nodes that share a common communication system. The data link layer is only aware of the neighboring nodes on a shared channel. Each new circuit connection requires a new link control. The physical layer is responsible for transporting the information frame into a form suitable for transmission onto a medium.

SUMMARY OF THE INVENTION

The present invention extends the concept of directory services to the management and control of enterprise networks by integrating directory technology, router/gateway management, and server management to form an enterprise network management and network security solution. By integrating directory services to perform these extended functions, a firewall can be deleted or omitted and a stronger implementation of firewall functions can be integrated into other network elements controlled by a master directory. From an architectural standpoint, the present invention provides supervisory control in the network and data link layers, rather than in the application layers as such control is traditionally provided.

An enterprise directory residing on a directory server stores the names, workstations, router/gateways, servers, IP addresses locations, passwords, and encryption keys for individuals. Periodically, the directory server downloads to each router/gateway across the WAN router/gateway access lists (RALs), thereby controlling all network access across the WAN. Also periodically, the directory server downloads user control files (UCFs) to servers in the network, thereby controlling all server access across the WAN. This directory-based invention thus provides enhanced network control, and enhanced network security.

CONCEPT OF THE INVENTION

Figure 1:
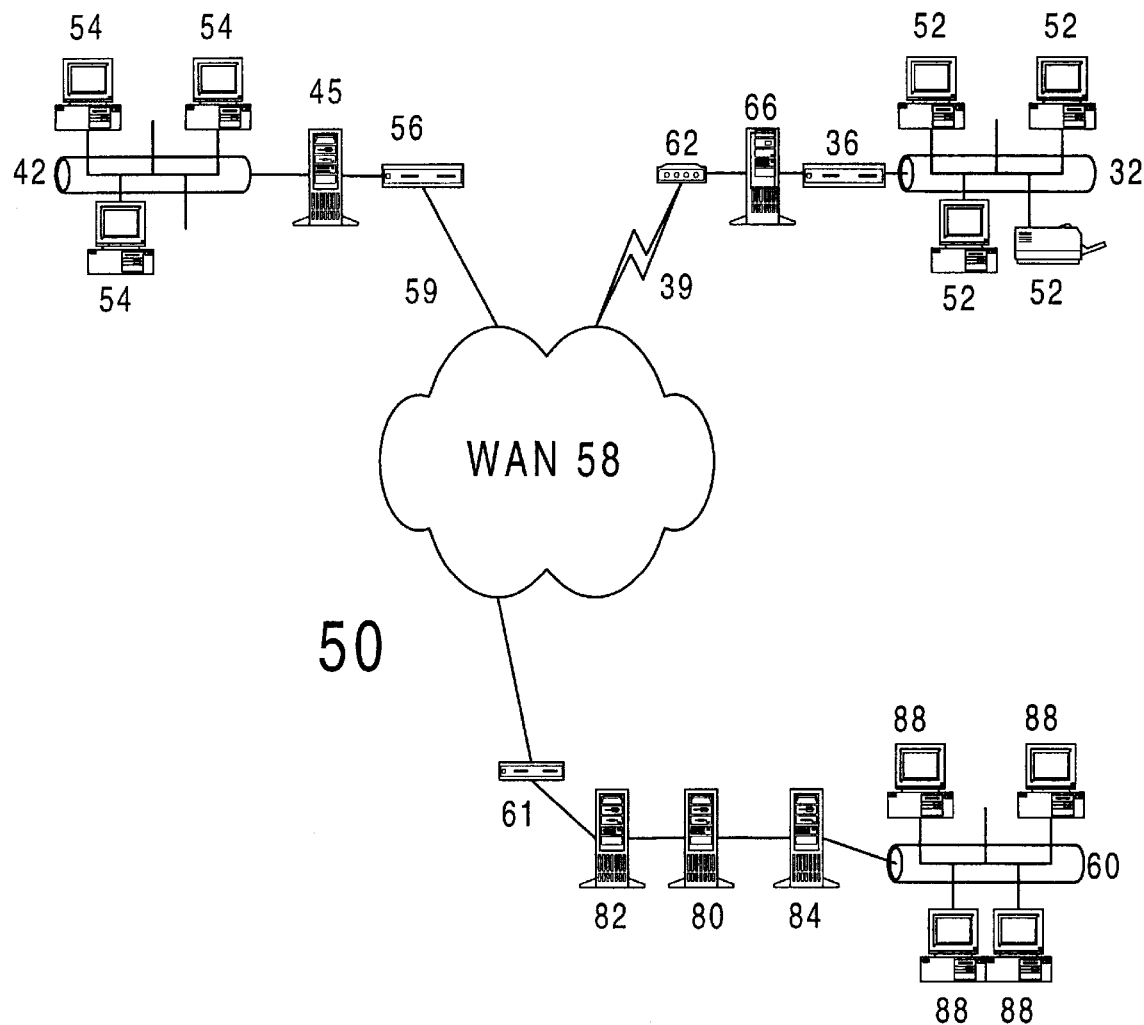
FIG. 1 illustrates a prior art network.

An enterprise directory residing on a directory server stores the names, workstations, router/gateways, servers, IP addresses locations, passwords, and encryption keys for individuals. Periodically, the directory server downloads to each router/gateway across the WAN router/gateway access lists (RALs), thereby controlling all network access across the WAN. Also periodically, the directory server downloads user control files (UCFs) to servers in the network, thereby controlling all server access across the WAN. This directory-based invention thus provides enhanced network control, and enhanced network security.

The directory uses the concepts of objects and object attributes. The users, router/gateways, and servers are objects. The IP address, password, privileges, and location are attributes of each user, server, and router/gateway. Another attribute of each router/gateway is the RAL. The RAL defines the operation of the router/gateway (i.e., defines which IP addressees will be routed to which designation). Because the directory knows the location and IP address of each user, and the location and IP address of each router/gateway, a directory application can periodically populate the RAL in each router/gateway on the network using LDAP. Entries in the directory thereby control the entire network and the network router/gateway configuration management is automated.

Network servers can be both physical and logical devices. A physical server located in an accounting department may contain a number of logical servers such as payroll, accounts receivable, accounts payable, etc. Access to these logical servers is controlled by user authentication and user privileges contained in the UCF on that server. The directory contains both the users and servers as objects. Directory user attributes include the authentication criteria and privileges for each server in the network. Directory attributes for each server includes the name of the UCF and the UCF contents. A directory application would then periodically populate the UCFs in each server with the directory user information. Entries in the directory then control access to ail server across the enterprise.

Because the user and user server access are tightly coupled and easily managed in the directory, the company can greatly restrict root level access, which typically allows server files to be modified, deleted, or copied. Such access is a major target for disgruntled employees. The ability to instantly change users and user access control directly affects the greatest source of network loss for many corporations. Passwords are a user attribute in the directory. Because the user and user passwords are tightly coupled and easily managed in the directory, the company can easily automate a password control program. The directory also manages e-mail, so the new password can be automatically distributed by secure e-mail. Effective password management can aid in reducing the second greatest network threat of security loss, i.e., loss due to social engineering.

Hostile external intrusion is the third area of network security. The present invention can replace the user authentication function of the firewall with the distributed user authentication of the directory services. Each router/gateway in the system will pass information only for the designated users. Logical servers have authentication services specific to that server. That individual server authentication can be password, token, or biometric. This distributed authentication provides greatly enhanced security over a firewall-protected network.

The present invention provides access control by directory management of RALS, and also provides user authentication capabilities that are associated with server access lists. The methods and means for authentication are currently by Microsoft NT servers or Sun Microsystems servers. This server-based authentication is generally adequate for small networking environments but may not be adequate for large enterprise networks.

To define enhanced security greater that the current server-based security, this invention uses certificates defined with the public key structure of X-509. X-509 is a subset of X-500 so that the X-509 public key structure is an integral part of the X-500 directory.

Certificates are a strong user authentication concept, exceeding firewall authentication, and can be integrated into directory services. Certificates represent flexible enabling technology, which allows clients and servers to authenticate themselves to each other, and set up an encrypted channel for the duration of a communication session. Certificates can be used to secure the communication link, the user identity, integrity of the data and confidentiality of the information. A corporation can issue certificates to its employees, customers, suppliers, contractors, and other business partners. These certificates can then be used to grant/deny access to sensitive network resources on the WAN.

A certification authority (CA) is a third-party authority responsible for issuing certificates to identify a community of individuals, systems or other entities which make use of a computer network. By digitally signing the certificates it issues, the CA vouches for the identity and trustworthiness of certificate owners. Network users possess the CA's own, self-signed public key certificate (often referred to as the "root key"), and use it to verify other users' certificates. In doing so, they have assurance that others are who they say they are, and know that the CA (whom they recognize and trust) vouches for them.

The invention integrates the directory attributes of public/private keys associates the keys with employees, vendor, and customer directory objects to provide a level of security and protection unavailable in prior art. By providing such general and generic control of enterprise security, the present invention allows the directory to define security policy on a user basis, whether this user is internal or external to the network, and provides as many options as there are users times the number of network controllable elements.

DETAILED DESCRIPTION

The present invention is a management system and method for an enterprise network. The invention can provide security by integrating directory technology with router/gateway management and server management.

Figure 4:
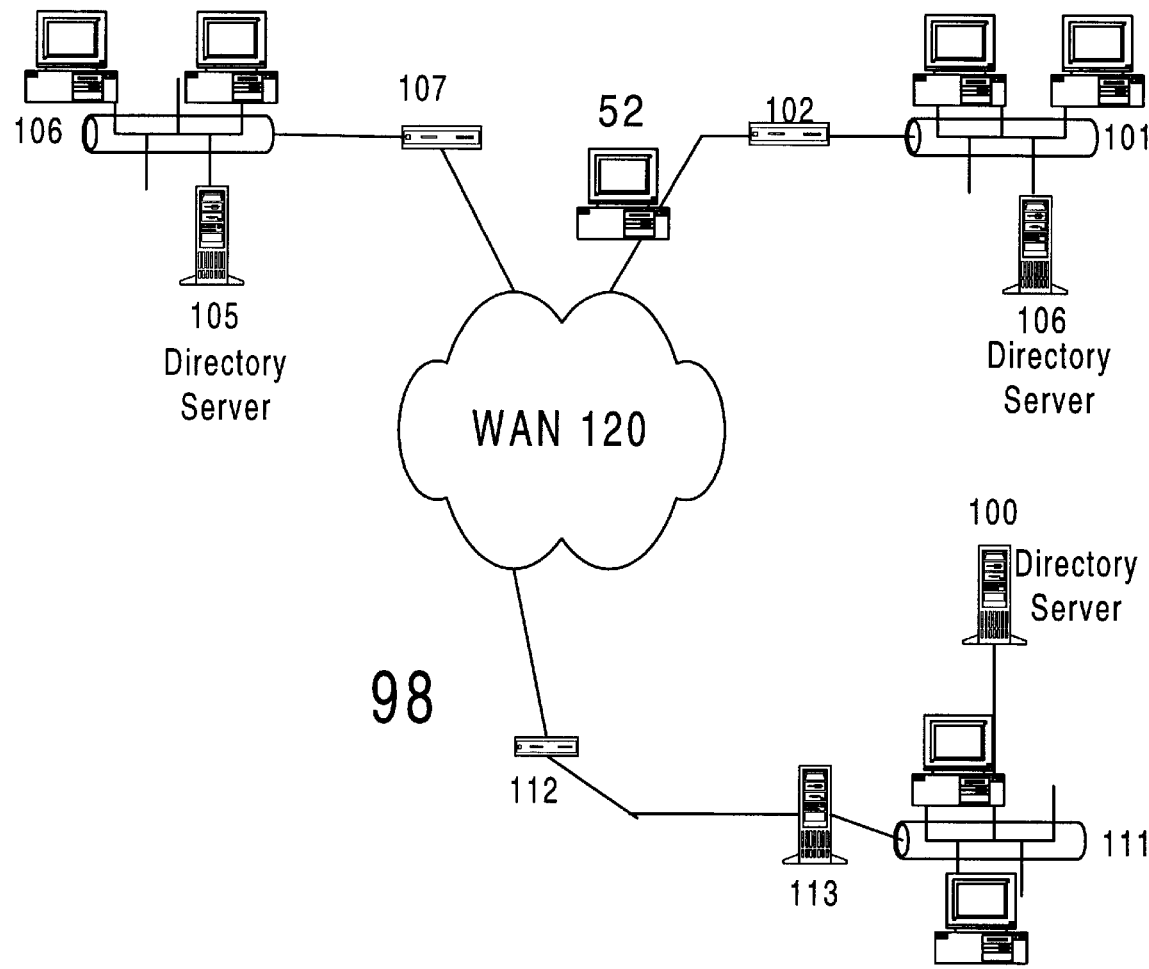
FIG. 4 is a functional block illustrating exemplary architecture and topology embodying the directory management of an embodiment of the present invention.

FIG. 4 is a functional block diagram illustrating an exemplary architecture and topology of an enterprise network 98 according to the present invention. A master directory, preferably implemented with X.500 or other standards, is located on a server 100 at a central location on an enterprise network on a LAN 101. Distributed directories may be located on remote servers 105 in the enterprise network on LAN 106. Master directory 100 and distributed directories 105 contain objects and object attributes. The distributed directories may be synchronous with the master directory. In the embodiment of the present invention, the objects may be individual's names, workstations, servers, and network routers/gateways. The individual's names may be the names of employees, vendors, or customers. The user attributes are preferably the IP address, location, password, and encryption keys. The user IP address contains the user location; the NetID field of the IP address identifies the LAN on which the user is located and therefore the location. The router/gateway attributes preferably are IP address, location, and router access list (RAL). The server attributes preferably are IP address, location, and the name of the user control file (UCF).

Relying on the user location, by designating the address of the LAN to which the user is resident, the directory services will download the RALs to the router/gateway to allow or deny access for each user to the WAN, depending upon the access privileges of that user contained in the directory. For example, master directory 100 may contain the users of LAN 111, and the NetID of the users' TCP/IP addresses will designate that they are associated with router/gateway 112. The RAL for router/gateway 112 resides in master directory 100 and is downloaded through router/gateway 102 and WAN 120 into router/gateway 112. After this download, only the users of LAN 111 that have privileges to use WAN 120 as set in master directory 100 will be able to be forwarded by router/gateway 112 to WAN 120. Complete control of WAN access is thereby controlled by directory entries.

To download the RAL to each router/gateway, a directory support application program (RAL-AP) is enabled. The RAL-AP scans the directory and determines the router/gateway association of each user in the directory. RAL-AP then generates the RALs for each router/gateway in the network. In the embodiment of FIG. 4, the RAL-AP would be an application in directory 100. The RAL-AP first pushes the RAL for router/gateway 102 by locating the IP address of the router/gateway 102 in the directory and pushes the data with the LDAP protocol. Using WAN 120, the RAL-AP pushes the RAL to each respective router/gateway found in the directory. In the embodiment of FIG. 4, router/gateways 107 and 112 would be similarly configured.

Similarly, user control files (UCFs) are attributes of servers in the directory. User privileges, set in the directory, define which servers each user can access. These UCFs are downloaded to each server in the directory structure. For example, server 113, resident on LAN 112, may contain the payroll records files, accounts receivable records files, and accounts payable records files all individually organized as logical servers inside physical server 113. Each of these logical servers will have a UCF associated with that server. The name of each logical server control file and the contents of that UCF are resident in master directory 100. Periodically, master directory 100 will reconstruct the individual server's UCF based on the latest user privileges defined in the master directory 100 and download that UCF to the appropriate server. Complete server access control is thereby controlled by directory entries.

Authenticated "log-on" procedures preferably are implemented on logical servers. The server must authenticate each user. This authentication may be done with a simple password that can be automated, or a secure password that is encrypted when transmitted through the network.

To download the user control file to each server, a directory support application program (UCF-AP) is enabled. UCF-AP scans the directory, determines the server association of each user in the directory and generates the UCFs for each server in the network. In FIG. 4, USC-AP is an application in server 100. USF-AP first pushes the UCF for server 113 by locating the IP address of server 113 in the directory and pushes the data with the NetBios protocol. Using the WAN 120 the program pushes the UCF to each server to find in the directory.

Figure 5:
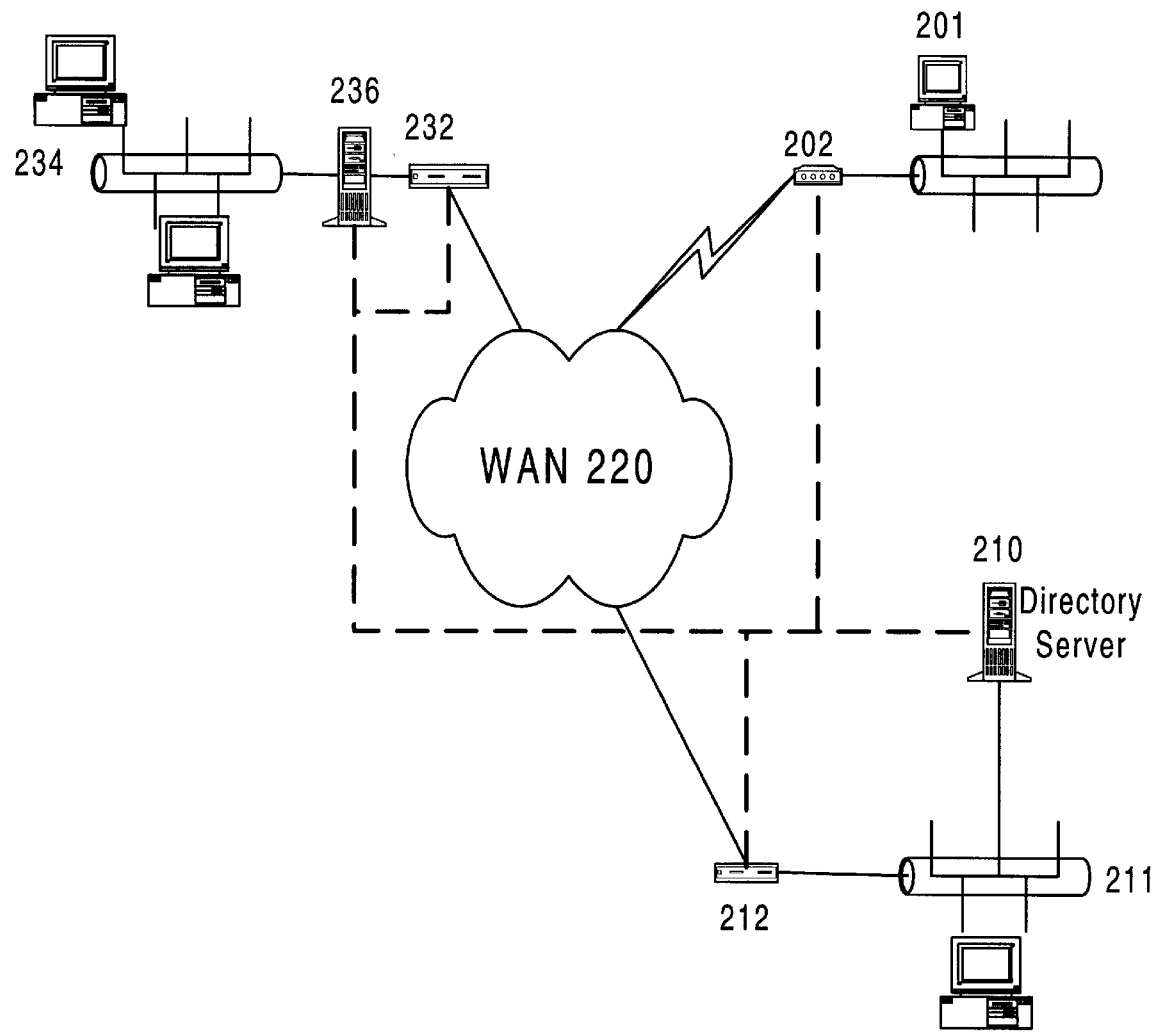
FIG. 5 is a functional block illustrating detailed operation of the network IP management of the present invention.

FIG. 5 is a functional block diagram illustrating exemplary architecture and topology according to the present invention as it is applied to mobile users. A mobile user with a portable-computing device 201 desires access to a home-computing network. The portable computing device may be a laptop computer, notebook computer, or any other device capable of remote digital information processing, such as a Portable Data ("PDA") terminal, Personal Communication System ("PCS") device, hand held computer, pen-based computer, tablet based computer, etc. Portable computing device 201 includes a modem 202 with digital to analog conversion to transmit digital information from portable computing devices over conventional voice transmission networks.

In the case of a notebook computer, as illustrated in FIG. 5, modem 202 may be embodied on a PC card fitted into a slot on the computer. Commercially available modem cards are suited to this application with minimal customization, although the present invention is not limited to any particular means of providing a modem 202 or its connection means to portable devices.

Figure 7:
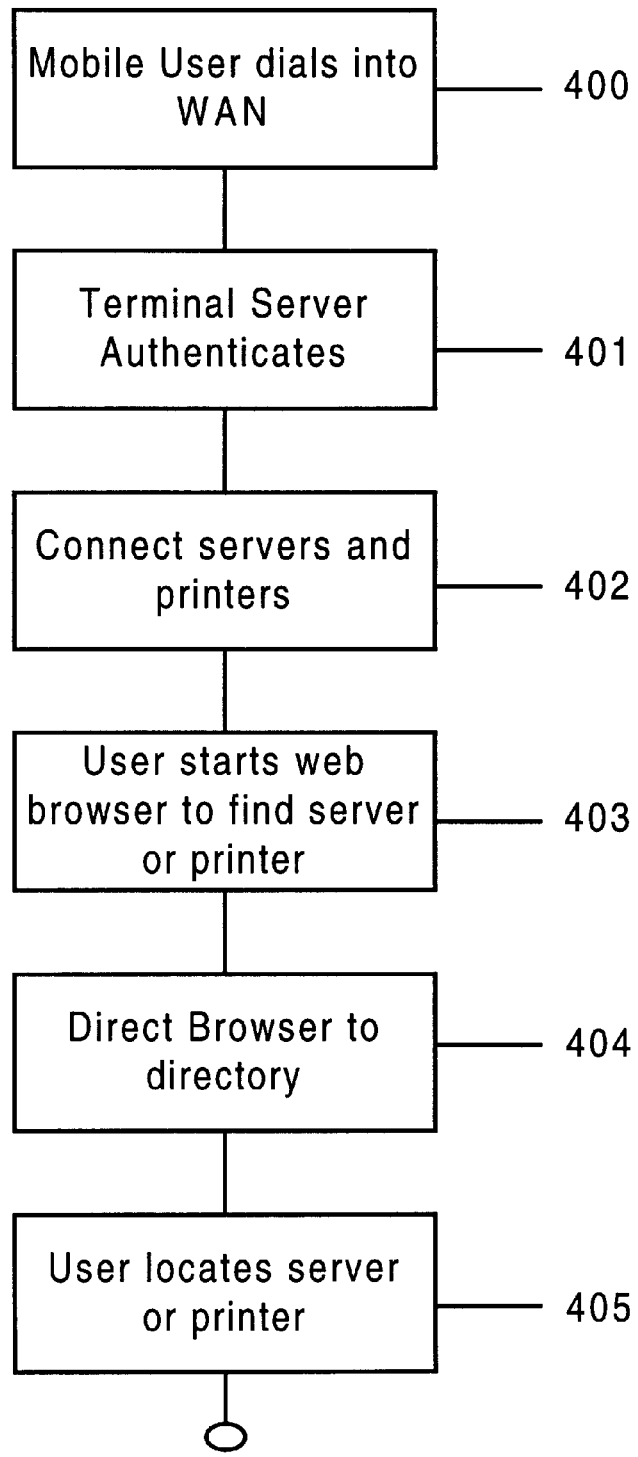
FIG. 7 is a flow chart illustrating a method according to the present invention.

FIG. 7 is a flow chart illustrating an exemplary method of access by remote users to a data grade system of the present invention (advantageously either the remote user or the operator of the destination server) for such access. Mobile user 201 dials into a WAN 120 through a terminal server connection at 400. The terminal server authenticates the mobile user with a user name and user password at 401. Servers and printers that have already been mapped to the user machine by using the resources' UNC name and NetBios will be connected to the machine with NetBios at 402.

If the user wants to find an additional server or printer (block 403) that has already been mapped to that machine the user will start the web browser, which will contain the proxy address of the Intranet server. The WebLink URL will direct the browser to the directory at 404. Searching the directory the user will locate the server or desired printer at 405.

The user than may copy the server or printer to the machine desktop or to My Computer or to the Printer Setup window, creating a shortcut that will allow the user to access the server or print to that printer.

Figure 6:
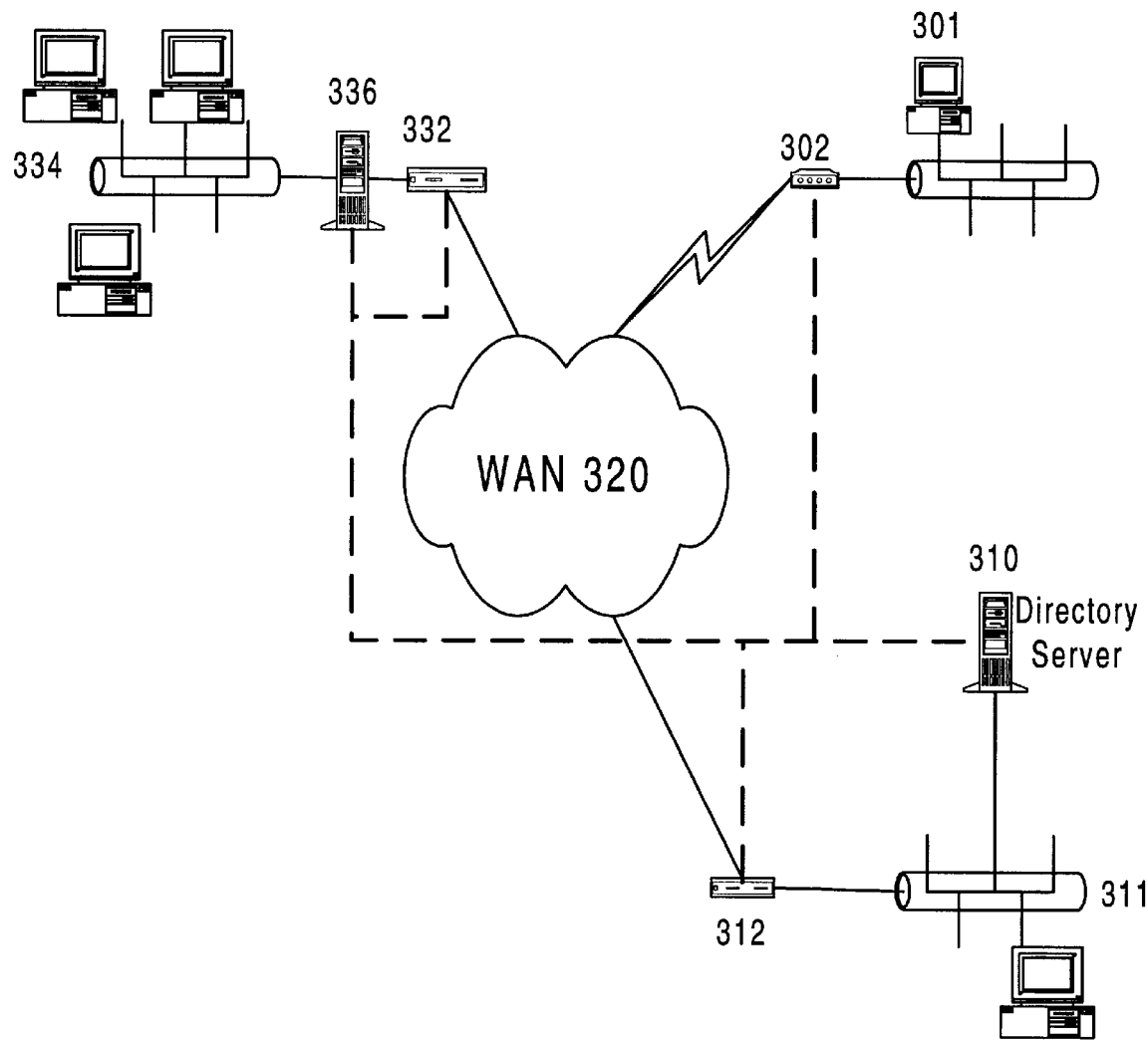
FIG. 6 is a functional block illustrating an exemplary architecture and topology embodying the directory management according to another embodiment of the present invention.

FIG. 6 is a block diagram showing the addition of digital certificate authentication to security and network control of this invention. Elements 312 and 332 are certificate routers/gateways. The X.509 standard, a subset of the X.500 standard that defines directory services, defines the certificate data structure and addresses the handling of public keys. A certificate is the digital equivalent of a driver's license or a passport. The certificate includes the name of the owner, name and signature of the certificate authority, an expiration date, and a serial number. Of course, all these items are present in a driver's license or passport. The certificate authority of a driver's license is the state and for a passport is the country.

In a method according to the present invention, user 301 has gained entrance to WAN 320 as before and has attempted to pass through router/gateway 332 that requires certificate authentication and encryption for valid communications. User 301 sends an X.509 request to router/gateway 332 that preferably contains the user's encrypted private key and the user's certificate authority name. Router/gateway 332 accesses the directory to obtain the user's information and the user's public key information as indicated by the dashed-lined connection in FIG. 6. With the user's private key from the user and the user' public key from the directory the server can validate the user identity.

The router/gateway 336 responds to user 301 with a X.509 certificate that contains the acknowledgement and the encrypted router/gateway's private key. User 301 accesses the directory to obtain the server's information and the user's public key information. With the server's private key from the server and the server's public key from the directory, user 301 can validate the identity of router/gateway 332. The corporation's certificate authority previously signed the user's certificate. Since both the server and the user recognize the validly of the corporation's signature the server and user both trust each other's identity.

After this initial dialog, a secure tunnel has been established between user 301 and router/gateway 332. Lower level protocols then use additional certificates to verify each data packet transmission. The transmissions use both a protocol and standard port designation. The combination of the protocol and the port is called a socket. The tunnel is established by a Secure Socket Link (SSL). Microsoft Corporation, Sun Microsystems, and Netscape Corporation also support X.509 and SSL.

Optional two-factor user authentication support is available with a token card. The first factor of the authentication method and means is a password and the second factor method and means is a physical token card in the user's possession. If the token card is readable by the user's computer the card may contain the user's public key information and thereby secure the user's machine when the card is not in place. SSL also can encrypt the transmission with digital encryption. Encryption is compliant with the IPSEC standard, supports multiple encryption algorithms (such as DES, 3-DES, RC5, CAST, Blowfish, IDEA), and supports PKCS 11-compliant tokens.

Figure 8:
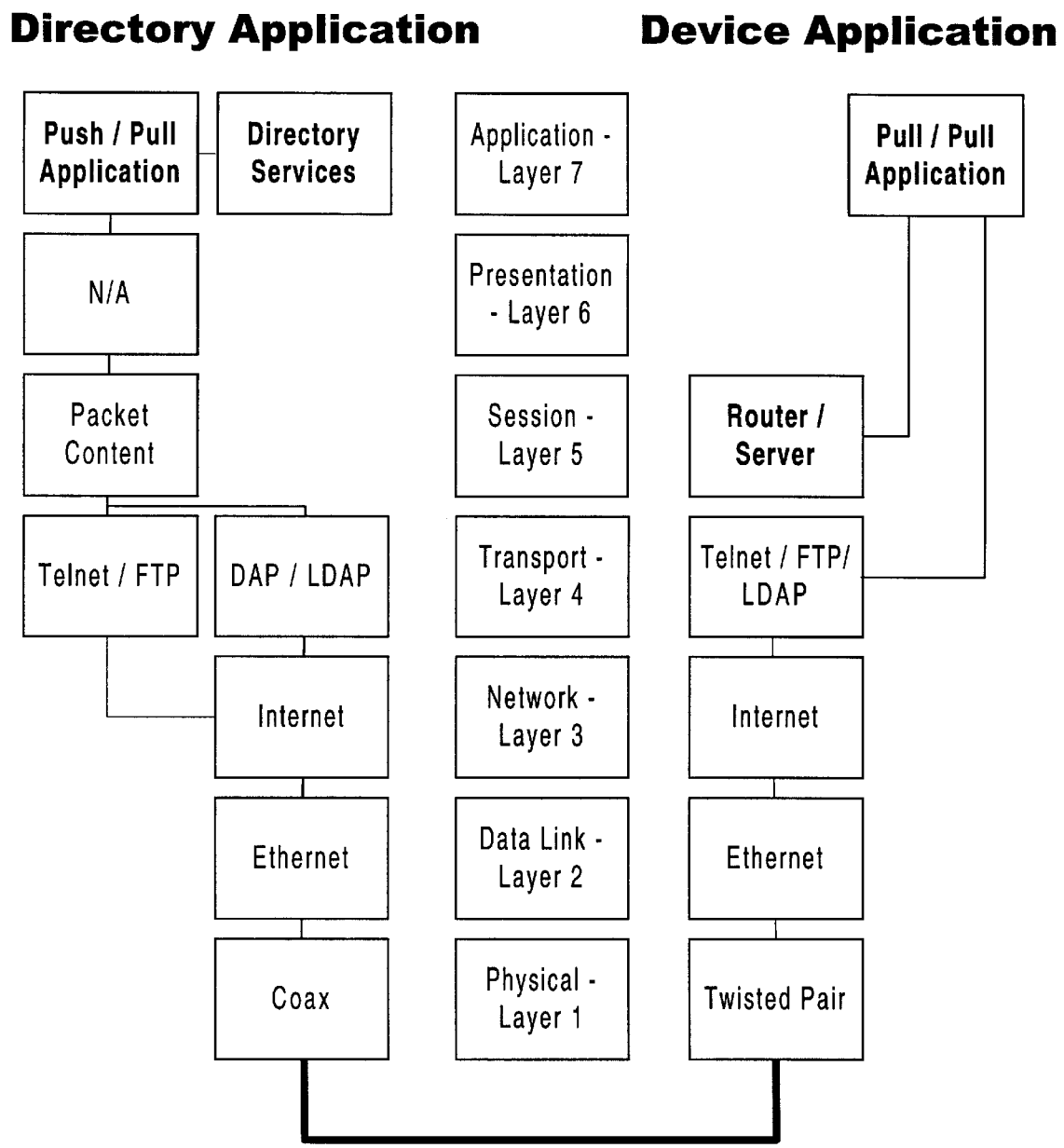
FIG. 8 is an architectural block diagram according to the present invention.

FIG. 8 is a block diagram of the ISO network architecture with the directory protocols operational at ISO network layers. The present invention utilizes the ability of the WAN network to support both DAP and LDAP protocols. This support allows the directory services at the Application layer to control routers/gateways, servers and firewalls at the Network layer without a special application. The connection between Application and Network layers is built with the RAL-AP and the UFC-AP. The present invention also recognizes the control at the Network layer can be accomplished with a write-only method and means. This invention thus utilizes master router access lists and server user control lists maintained in the directory that are written to the router/gateway and server devices on a periodic basis.

Having described preferred embodiments, it should be apparent that modifications can be made without departing from the scope of the present invention.

What is claimed is:

1. A master directory service for a wide area network (WAN), comprising:
   a wide area network;
   a plurality of local area networks (LAN) connected to the WAN through router/gateways;
   a directory connected to one or more LAN;
   a master directory having a directory of objects, including servers and router/gateways, the objects having attributes for indicating access right, connected to one of said plurality of LANS, said master directory distributing information to the directory of each LAN, said information indicating which of the users of each of the plurality of LANs connected to the WAN, allowed to have access to the WAN resources such as router/gateways, servers and workstations.

2. The network of claim 1, wherein the each router/gateway serves as a certification security, certification conforms to X.509 standards, and each directory conforms to at least one of X.500 and LDAP standards.

3. The WAN according to claim 1, wherein the WAN is a data grade network.

4. The WAN according to claim 1, wherein the WAN is an Internet that uses TCP/IP.

5. The WAN according to claim 1, wherein the master directory periodically updates the attribute information of each directory of each LAN.

6. The WAN according to claim 5, wherein the master directory updates the attribute information daily.

7. The WAN according to claim 1, wherein the attribute information to each server includes a table associating names and source addresses, the server determining the name from the source address and determining whether access is to be allowed from the name associated with the source address.

8. The WAN according to claim 1, wherein one or more LAN router/gateway(s) serves as a certification gateway for security.

9. The WAN according to claim 8, wherein the certification conforms to X.509 standards.

10. The WAN according to claim 1, wherein each directory and the master directory conforms to at least one of X.500 and LDAP standards.

11. The network of claim 1, wherein the master directory is a single master directory.

12. The network of claim 1, wherein the master directory is a distributed directory, distributed among local area networks.

13. A method for managing access in an enterprise network interconnected over a wide area network (WAN), the method comprising:

maintaining a master directory with objects indicating servers and router/gateways, the objects having attributes indicating access rights to and/or from the object;

providing to a router/gateway, which is in data communication with the WAN, information from the master directory indicating which clients on the enterprise network are allowed to access information over the WAN; and providing to a server, which is in data communication with the WAN, information from the master directory indicating which clients of the enterprise network are allowed to retrieve, store/update information to/from the server.

14. The method of claim 13, wherein the providing steps are each performed periodically.

15. The method of claim 13, wherein the information from the master directory is provided to each router/gateway and server over the WAN.

16. The method of claim 13, wherein the enterprise network has a plurality of router/gateways and a plurality of servers in data communication with the WAN, the method including providing access information to each of the router/gateways and to each of the servers.

17. The method of claim 13, wherein the maintaining is performed in accordance with at least one of X.500 and LDAP standards.

18. A network comprising:

a master directory having objects and attributes, the objects including router/gateways and the attributes for the router/gateways including a router/gateway access list (RAL); and a router/gateway connected to a group of users for providing access for the users to a wide area network (WAN), the router/gateway for receiving its respective RAL from the master directory and for using information in the RAL to determine whether one of the group of users will be allowed access to the WAN.

19. The network of claim 18 where master directory information is requested by an application program running in the router/gateway.

20. The network of claim 18 where master directory information is provided by an application program accessing the master directory.

21. A network comprising:

a master directory having objects and attributes, the objects including servers and the attributes for the servers including a user control file (UCF); and a number of servers connected to and accessible over a wide area network (WAN) for providing information to users over the WAN, each server receiving its respective UCF from the master directory and for using the UCF to determine whether a user will be allowed access WAN resources, including router/gateways, servers and workstations.

22. The network of claim 21 where master directory information is requested by an application program running in the server.

23. The network of claim 21 where master directory information is provided by an application program accessing the master directory.

* * * * *

UNITED STATES PATENT AND TRADEMARK OFFICE
CERTIFICATE OF CORRECTION

PATENT NO. : 6,131,120
DATED : Oct. 10, 2000
INVENTOR(S) : William J. Reid

It is certified that error appears in the above-identified patent and that said Letters Patent is hereby corrected as shown below:

In the Title, after "MANAGEMENT" insert -- USING --.

In the Abstract, Line 2, change "directing" to -- directory --;

Line 4, change "sewers" to -- servers --.

Signed and Sealed this

Eighth Day of May, 2001

Attest:

NICHOLAS P. GODICI

Attesting Officer

Acting Director of the United States Patent and Trademark Office

UNITED STATES PATENT AND TRADEMARK OFFICE
CERTIFICATE OF CORRECTION

PATENT NO. : 6,131,120
DATED : October 10, 2000
INVENTOR(S) : William J. Reid

It is certified that error appears in the above-identified patent and that said Letters Patent is hereby corrected as shown below:

Column 1,
Line 49, change "(PSTN) 64" to -- (PSTN) 39 --;

Column 2,
Line 65, change "workstation 86" to -- workstation 88 --;

Column 6,
Line 39, change "ail" to -- all --;

Column 7,
Line 56, change "LAN 101" to -- LAN 111 --;

Column 8,
Lines 15-16, change "router / gateway 102 and WAN 120" to -- LAN 111 and server 113 --;
Line 39, change "LAN 112" to -- LAN 111 --;
Line 39, change "LAN 112" to -- LAN 111 --;
Line 65, change "to find" to -- found --;

Column 9,
Line 21, change "remote users" -- remote users of FIG 5 and FIG 6 --;
Line 54, change "is" to -- would be --;
Line 55, change "is" to -- would be --;

UNITED STATES PATENT AND TRADEMARK OFFICE
CERTIFICATE OF CORRECTION

PATENT NO.    : 6,131,120
DATED         : October 10, 2000
INVENTOR(S)   : William J. Reid It is certified that error appears in the above-identified patent and that said Letters Patent is hereby corrected as shown below:

Column 10,
Line 1, change "336" to -- 332 --;

Drawings,
Figure 4 remove object 52

Title page,
Should be deleted to be replaced with the attached title page.

Signed and Sealed this

Second Day of April, 2002

*Attest:*

JAMES E. ROGAN
*Director of the United States Patent and Trademark Office*

*Attesting Officer*

United States Patent [19]
Reid

[11] Patent Number: 6,131,120
[45] Date of Patent: Oct. 10, 2000

[54] ENTERPRISE NETWORK MANAGEMENT DIRECTORY CONTAINING NETWORK ADDRESSES OF USERS AND DEVICES PROVIDING ACCESS LISTS TO ROUTERS AND SERVERS

[75] Inventor: William J. Reid, Dallas, Tex.

[73] Assignee: Directory Logic, Inc., Dallas, Tex.

[21] Appl. No.: 08/956,697

[22] Filed: Oct. 24, 1997

[51] Int. Cl.[7] .................... G06F 15/173; G06F 15/16
[52] U.S. Cl. .................. 709/225; 709/238; 709/249
[58] Field of Search ............................ 709/225, 238, 709/249

[56] References Cited

U.S. PATENT DOCUMENTS

| | | | |
|---|---|---|---|
| 5,634,010 | 5/1997 | Liscon et al. | 709/223 |
| 5,774,668 | 6/1998 | Choquier et al. | 709/223 |
| 5,796,727 | 8/1998 | Harrison et al. | 370/338 |
| 5,825,772 | 10/1998 | Dobbins et al. | 370/396 |

*Primary Examiner*—Krisna Lim
*Attorney, Agent, or Firm*—John E. Vandigriff

[57] ABSTRACT

An enterprise network using a wide area network (WAN), and having routers and servers, uses a master directing to determine access rights, including the ability to access the WAN through the routers and the ability to access the sewer over the WAN.

23 Claims, 8 Drawing Sheets

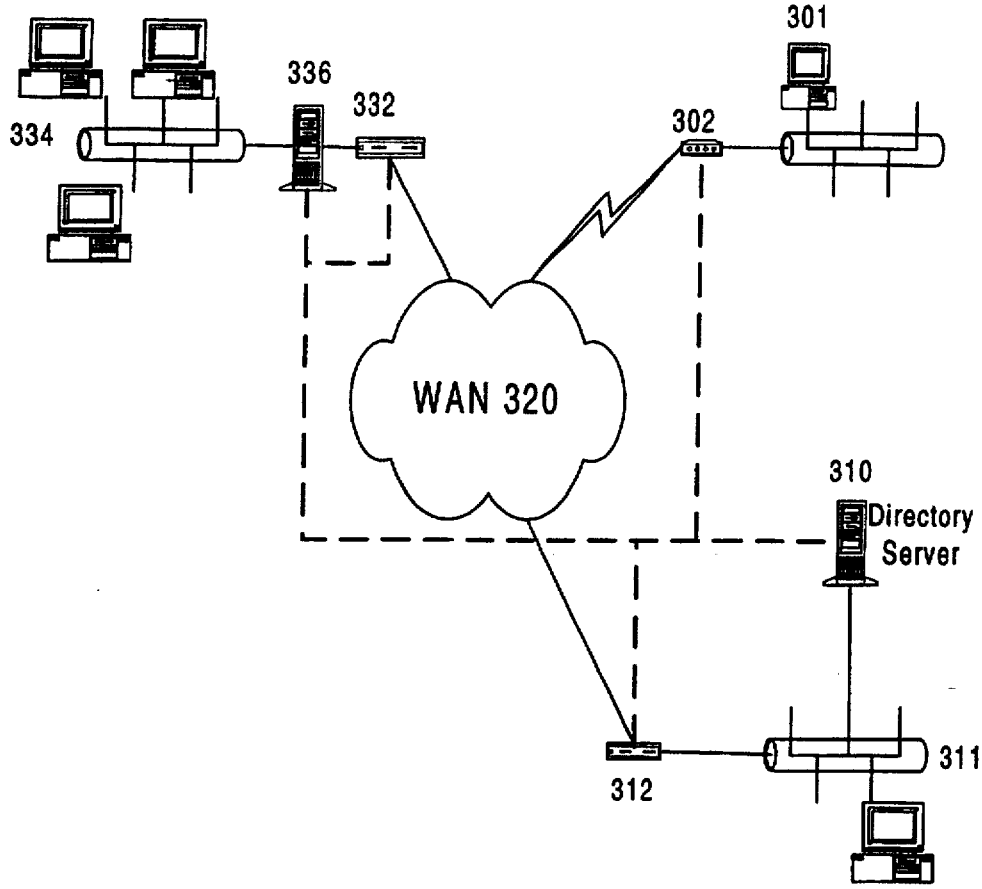

UNITED STATES PATENT AND TRADEMARK OFFICE
CERTIFICATE OF CORRECTION

PATENT NO. : 6,131,120
DATED : October 10, 2000
INVENTOR(S) : William J. Reid

Figure 2:
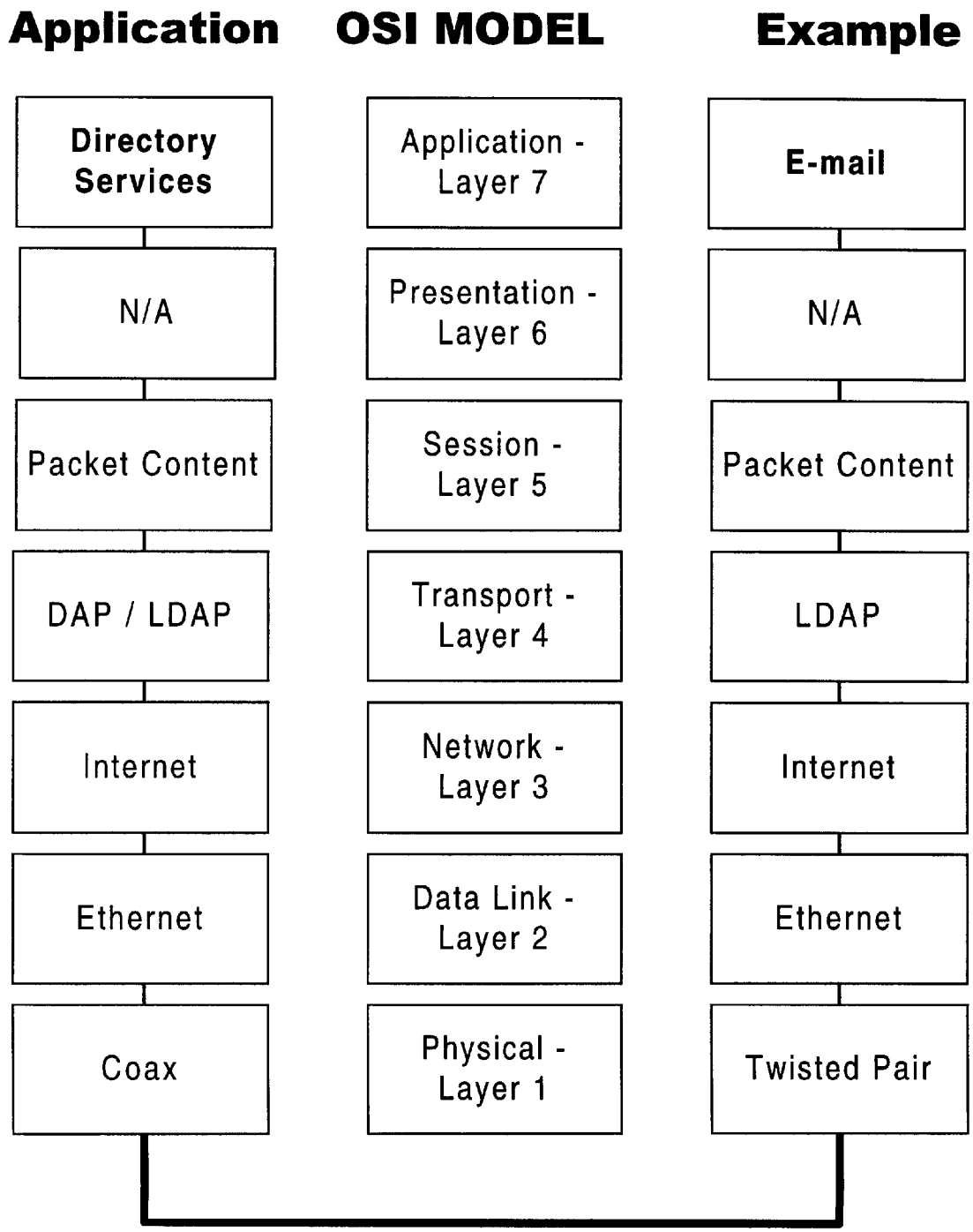
FIG. 2 illustrates a prior art architectural block diagram.
Figure 3:
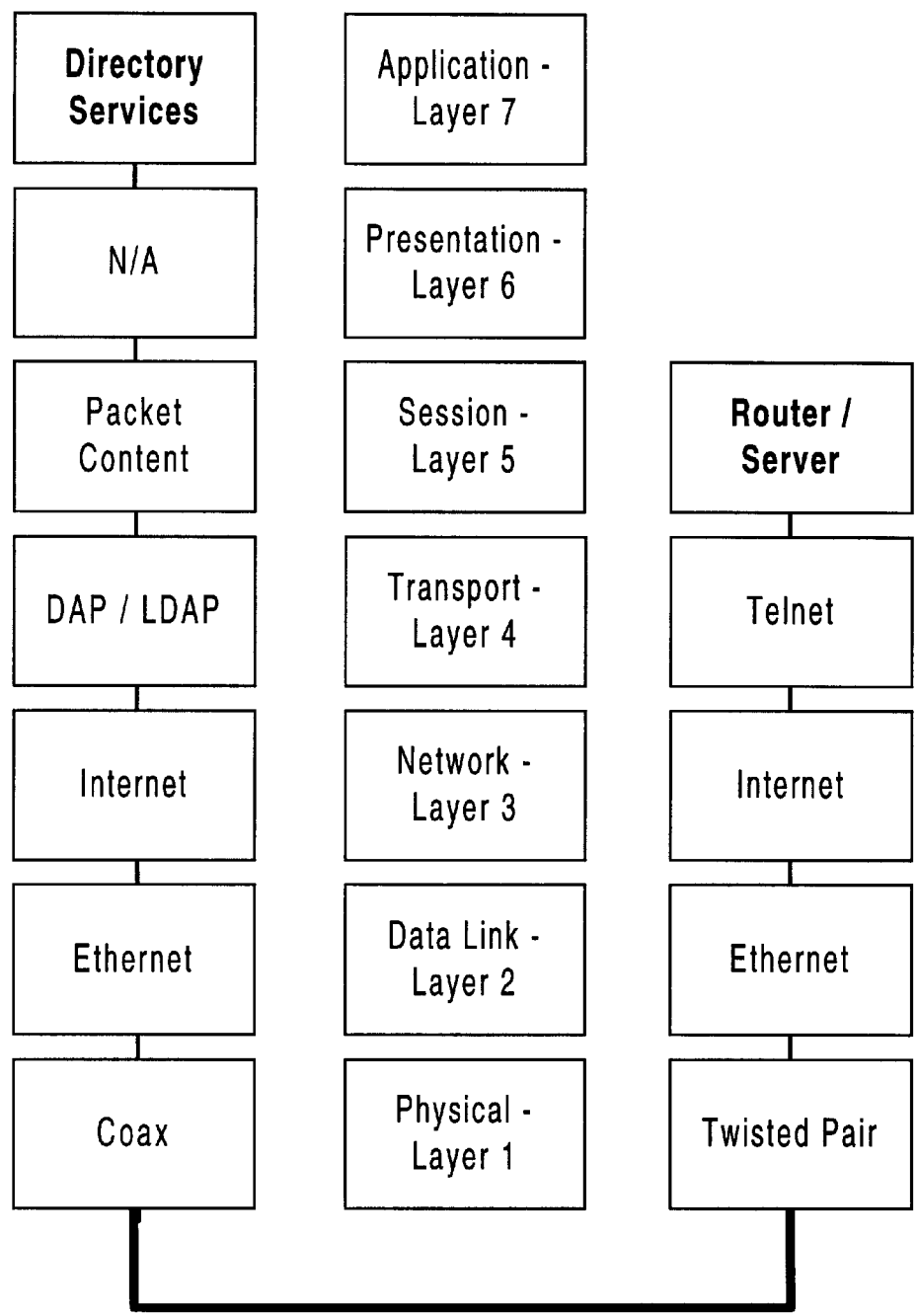
FIG. 3 illustrates a prior art architectural protocol block diagram.

It is certified that error appears in the above-identified patent and that said Letters Patent is hereby corrected as shown below:

Drawings,
Figure 2, Column 3, change "LDAP" to -- POP3--.

Column 3,
Line 63, change "workstation 86" to -- workstation 88 --.

Column 8,
Line 60, change "USC-AP" to -- UCF--AP--.
Line 61, change "USC-AP" to -- UCF-AP--.

Column 9,
Lines 62 and 66, change "private" to -- public --.

Signed and Sealed this

Third Day of August, 2004

JON W. DUDAS
*Acting Director of the United States Patent and Trademark Office*